(12) United States Patent
Tang et al.

(10) Patent No.: US 12,306,706 B2
(45) Date of Patent: May 20, 2025

(54) PERFORMING CI/CD ERROR ANALYSIS INVOLVING SOFTWARE PRODUCTS THAT ARE DEPENDENT UPON EACH OTHER

(71) Applicant: International Business Machines Corporation, Armonk, NY (US)

(72) Inventors: Shu Jun Tang, Beijing (CN); Jia Lin Wang, Beijing (CN); Qi Han Zheng, Beijing (CN); Yi Fan Wu, Beijing (CN); Jing Jing Wei, Beijing (CN); Zhi Li Guan, Beijing (CN); Yang Kang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 18/078,385

(22) Filed: Dec. 9, 2022

(65) Prior Publication Data
US 2024/0193032 A1    Jun. 13, 2024

(51) Int. Cl.
G06F 11/00    (2006.01)
G06F 11/07    (2006.01)
G06F 11/362   (2025.01)
G06F 11/3668  (2025.01)

(52) U.S. Cl.
CPC ........ *G06F 11/079* (2013.01); *G06F 11/0706* (2013.01); *G06F 11/0775* (2013.01); *G06F 11/366* (2013.01); *G06F 11/3668* (2013.01)

(58) Field of Classification Search
CPC ............. G06F 11/0706; G06F 11/0775; G06F 11/079; G06F 11/0793; G06F 11/366; G06F 11/3668; G06F 11/0769; G06F 11/0772

USPC ....................................................... 714/1–57
See application file for complete search history.

(56) References Cited

U.S. PATENT DOCUMENTS

| 10,452,527 B2 | 10/2019 | Matthews et al. |
| 10,936,468 B1 * | 3/2021 | Ochlak ...................... G06F 8/75 |
| 11,212,170 B1 * | 12/2021 | Bijlani ................ H04L 41/0886 |
| 11,726,854 B2 * | 8/2023 | Bregman ............. G06F 11/3409 714/48 |
| 2020/0110693 A1 | 4/2020 | Herrin et al. |
| 2021/0019249 A1 | 1/2021 | Gnaneswaran et al. |

(Continued)

FOREIGN PATENT DOCUMENTS

| CN | 111475260 A | 7/2020 |
| WO | WO-2022054101 A1 * | 3/2022 |

*Primary Examiner* — Sarai E Butler
(74) *Attorney, Agent, or Firm* — Shackelford, McKinley & Norton, LLP; Robert A. Voigt, Jr.

(57) ABSTRACT

A computer-implemented method, system and computer program product for identifying a root cause of failures in a CI/CD pipeline. Tags for tasks, templates and/or variables of the operator and the CI/CD pipeline are extracted. Code of the tagged tasks, templates and/or variables of the operator are mapped with the code of the tagged tasks, templates and/or variables of the CI/CD pipeline forming mappings. Additionally, code of the tagged tasks, templates and/or variables between the roles of the operator are mapped forming mappings. Upon receiving a notification of a failure in the CI/CD pipeline, a root cause of the failure is identified by searching such mappings for a mapped role or task in relation to the role or task involving the software product which failed in the CI/CD pipeline and searching the log file of the operator for an error in connection with such mapped role or task.

20 Claims, 7 Drawing Sheets

(56) References Cited

U.S. PATENT DOCUMENTS

| | | |
|---|---|---|
| 2021/0103512 A1 | 4/2021 | Peterson et al. |
| 2021/0234930 A1 | 7/2021 | Dinh et al. |
| 2021/0326197 A1* | 10/2021 | Honnappa ............... G06N 5/022 |
| 2023/0106675 A1* | 4/2023 | Pande ................. G06F 11/3692 |
| | | 717/124 |
| 2023/0138602 A1* | 5/2023 | Bregman ................ G06F 8/71 |
| | | 717/170 |

* cited by examiner

401

| Task Id | Task Name | Tags | File Name and Path | Variables Used | Template Used |
|---|---|---|---|---|---|
| 1 | Task A | Pre, task, RoleA,check,configmap, cp4ba_configmap | tasks/main.yaml | variable Id 1, variable Id 2 | template Id 1 |

| Task Id | Template Name | Tags | File Name and Path |
|---|---|---|---|
| 1 | Template B | Deploy, template, RoleA,add, configmap, cp4ba_configmap | tasks/main.yaml |

| Var Id | Var Name | Tags | File Name and Path |
|---|---|---|---|
| 1 | Var C | Post, var, RoleA, route, cp4ba_route | tasks/main.yml |

FIG. 4C

PERFORMING CI/CD ERROR ANALYSIS INVOLVING SOFTWARE PRODUCTS THAT ARE DEPENDENT UPON EACH OTHER

TECHNICAL FIELD

The present disclosure relates generally to continuous integration and continuous delivery (CI/CD), and more particularly to performing continuous integration and continuous delivery (CI/CD) error analysis involving software products that are dependent upon each other.

BACKGROUND

In software engineering, CI/CD or CICD is the combined practices of continuous integration (CI) and continuous delivery (CD). CI/CD bridges the gaps between development and operation activities and teams by enforcing automation in building, testing and deployment of applications. CI/CD services compile the incremental code changes made by developers, then link and package them into software deliverables. Automated tests verify the software functionality, and automated deployment services deliver them to end users. The aim is to increase early defect discovery, increase productivity and provide faster release cycles.

SUMMARY

In one embodiment of the present disclosure, a computer-implemented method for identifying a root cause of failures in a continuous integration and continuous delivery (CI/CD) pipeline comprises extracting tags for tasks, templates and/or variables of an operator. The method further comprises extracting tags for tasks, templates and/or variables of the CI/CD pipeline. The method additionally comprises mapping code of tagged tasks, templates and/or variables of the operator with code of tagged tasks, templates and/or variables of the CI/CD pipeline to form mappings. Furthermore, the method comprises mapping code of tagged tasks, templates and/or variables between roles of the operator to form the mappings. Additionally, the method comprises receiving a notification of a failure in the CI/CD pipeline. In addition, the method comprises identifying a root cause of the failure by searching the mappings.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 4A illustrates a table for storing the tags of tasks in accordance with an embodiment of the present disclosure;

FIG. 4B illustrates a table for storing the tags of templates in accordance with an embodiment of the present disclosure;

FIG. 4C illustrates a table for storing the tags of variables in accordance with an embodiment of the present disclosure;

DETAILED DESCRIPTION

Figure 1:
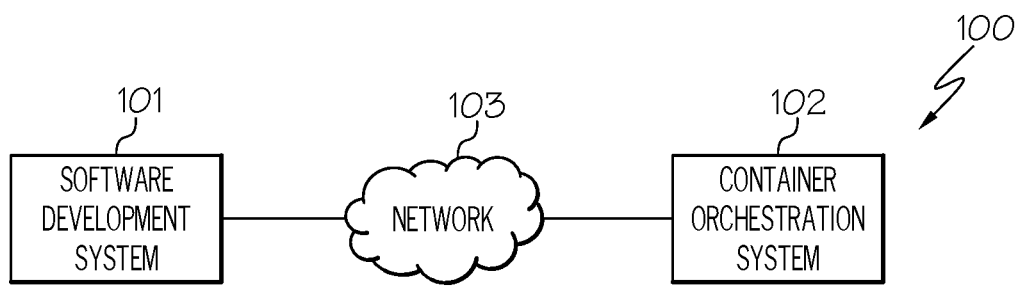
FIG. 1 illustrates a communication system for practicing the principles of the present disclosure in accordance with an embodiment of the present disclosure.

As stated in the Background section, in software engineering, CI/CD or CICD is the combined practices of continuous integration (CI) and continuous delivery (CD). CI/CD bridges the gaps between development and operation activities and teams by enforcing automation in building, testing and deployment of applications. CI/CD services compile the incremental code changes made by developers, then link and package them into software deliverables. Automated tests verify the software functionality, and automated deployment services deliver them to end users. The aim is to increase early defect discovery, increase productivity and provide faster release cycles.

Recently, organizations have set up CI/CD pipelines that leverage platforms of container orchestration systems. Container orchestration systems (e.g., Kubernetes®) automate the deployment, management, scaling and networking of containers. A container refers to a standard unit of software that packages up code and all its dependencies so that the application runs quickly and reliably from one computing environment to another.

These containers may be run in "pods" by the container orchestration systems. A "pod" is a group of one or more containers, which may be deployed to a node. All the containers in the pod share an Internet Protocol (IP) address, inter-process communication (IPC), hostname and other resources. Furthermore, a pod represents a single instance of a running process (instance of a program) in the cluster.

Such pods may reside in a node, referred to as a "worker node." A worker node is used to run containerized applications and handle networking to ensure that traffic between applications across the cluster and from outside of the cluster can be properly facilitated. A "cluster," as used herein, refers to a set of nodes (e.g., worker nodes) that run containerized applications (containerized applications package an application with its dependencies and necessary services).

Container orchestration systems are designed for automation, such as automating a task beyond what container orchestration systems typically provide. Such automation may be performed via the use of "operators." Operators are clients of the container orchestration system's application programming interface (API) that act as controllers for a custom resource. Examples of operations performed by operators include: deploying an application on demand, taking and restoring backups of that application's state, handling upgrades of the application code alongside related changes, such as database schemas or extra configuration settings, publishing a service to applications that do not support APIs to discover them, simulating failure in all or part of a cluster to test its resilience, etc. Another example of an operation performed by operators is the installation of a series of software products that are interrelated and integrated in the container orchestration system. The operator's CI/CD then checks the quality of these installed multiple software products that have dependencies between them.

As discussed above, a CI/CD pipeline automates the software delivery process. To avoid delivery delays, failures in the CI/CD pipeline need to be resolved quickly. For a simple project, such failures in the CI/CD pipeline may be resolved by implementing a revert commend, which corresponds to a forward-moving undo operation. However, such a method is not applicable in all cases, such as when failures occur in the CI/CD pipeline involving a series of software products that are interrelated and integrated.

For example, when an operator installs a series of software products that are interrelated and integrated in the container orchestration system, the operator's CI/CD then checks the quality of these installed software products that have dependencies between them. However, testing the quality of multiple software products that have dependencies between them is complicated and identifying the root cause of a failure involving such software products may not be easy to capture.

For instance, if an operator installed software products A, B and C that have dependencies between them and a failure occurred in the operator's CI/CD process involving a function test of software product C, the root cause may not be able to be identified, such as by implementing a revert command. For example, if software product C depends upon software product B which depends upon software product A, and the root cause of the failure was due to a change in software product A, then a revert comment, which corresponds to a forward-moving undo operation, would not capture the change in software product A. As a result, such a failure in the CI/CD process would not be captured.

Hence, there is not currently a means for effectively identifying the failure in a CI/CD pipeline involving an operator installing multiple software products that have dependencies between them in a container orchestration system.

The embodiments of the present disclosure provide a means for effectively identifying the failure in a CI/CD pipeline involving an operator installing multiple software products that have dependencies between them in a container orchestration system by mapping tagged tasks, templates and/or variables between the operator and the CI/CD pipeline as well as mapping the tagged tasks, templates and/or variables between the roles in the operator thereby enabling dependences and interactions between the operator and the CI/CD pipeline or between the roles inside the operator to be discovered. By discovering such dependencies and interactions, the root cause of a failure in the CI/CD pipeline may be discovered as discussed further below.

In some embodiments of the present disclosure, the present disclosure comprises a computer-implemented method, system and computer program product for identifying a root cause of failures in a CI/CD pipeline. In one embodiment of the present disclosure, tags for tasks, templates and/or variables of the operator as well as tags for tasks, templates and/or variables of the CI/CD pipeline are extracted. In one embodiment, such tags are extracted by analyzing the code of the operator and the CI/CD pipeline, such as via static analysis or dynamic analysis. Code of the tagged tasks, templates and/or variables of the operator are mapped with the code of the tagged tasks, templates and/or variables of the CI/CD pipeline forming mappings. Additionally, code of the tagged tasks, templates and/or variables between the roles of the operator are mapped forming mappings. By forming such mappings, dependencies and interactions between the operator and the CI/CD pipeline or between roles inside the operator may be discovered. By discovering such dependencies and interactions, the root cause of a failure in the CI/CD pipeline may be discovered. For example, upon receiving a notification of a failure in the CI/CD pipeline, a root cause of the failure may be identified by searching such mappings for a mapped role or task in relation to the role or task involving the software product which failed in the CI/CD pipeline and searching the log file of the operator for an error in connection with such mapped role or task. In this manner, failures in the CI/CD pipeline involving an operator installing multiple software products that have dependencies between them in the container orchestration system may be discovered.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a software development system 101 connected to a container orchestration system 102 via a network 103.

Software development system 101 is a system utilized, such as by software developers, in the process of creating, designing, deploying and supporting software. Examples of such software development systems include, but not limited to, RAD Studio®, Embold®, Collaborator®, Studio 3T®, NetBeans®, Zend Studio®, Microsoft® Expression Studio, etc.

In one embodiment, software development system 101 is utilized by a software developer to deploy, manage, scale and network containers using container orchestration system 102 (e.g., Kubernetes®, Apache® Mesos, Amazon ECS®) via network 103.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, container orchestration system 102 automates the deployment, management, scaling and networking of containers. A "container," as used herein, refers to a standard unit of software that packages up code and all its dependencies so that the application runs quickly and reliably from one computing environment to another.

Furthermore, in one embodiment, container orchestration system 102 is configured to identify failures in a continuous integration and continuous delivery (CI/CD) pipeline that leverages the platform of container orchestration system 102 as discussed further below. A description of the architecture of container orchestration system 102 is provided below in connection with FIG. 2. A description of the hardware configuration of container orchestration system 102 is provided further below in connection with FIG. 5.

System 100 is not to be limited in scope to any one particular network architecture. System 100 may include any number of software development systems 101, container orchestration systems 102 and networks 103.

Figure 2:
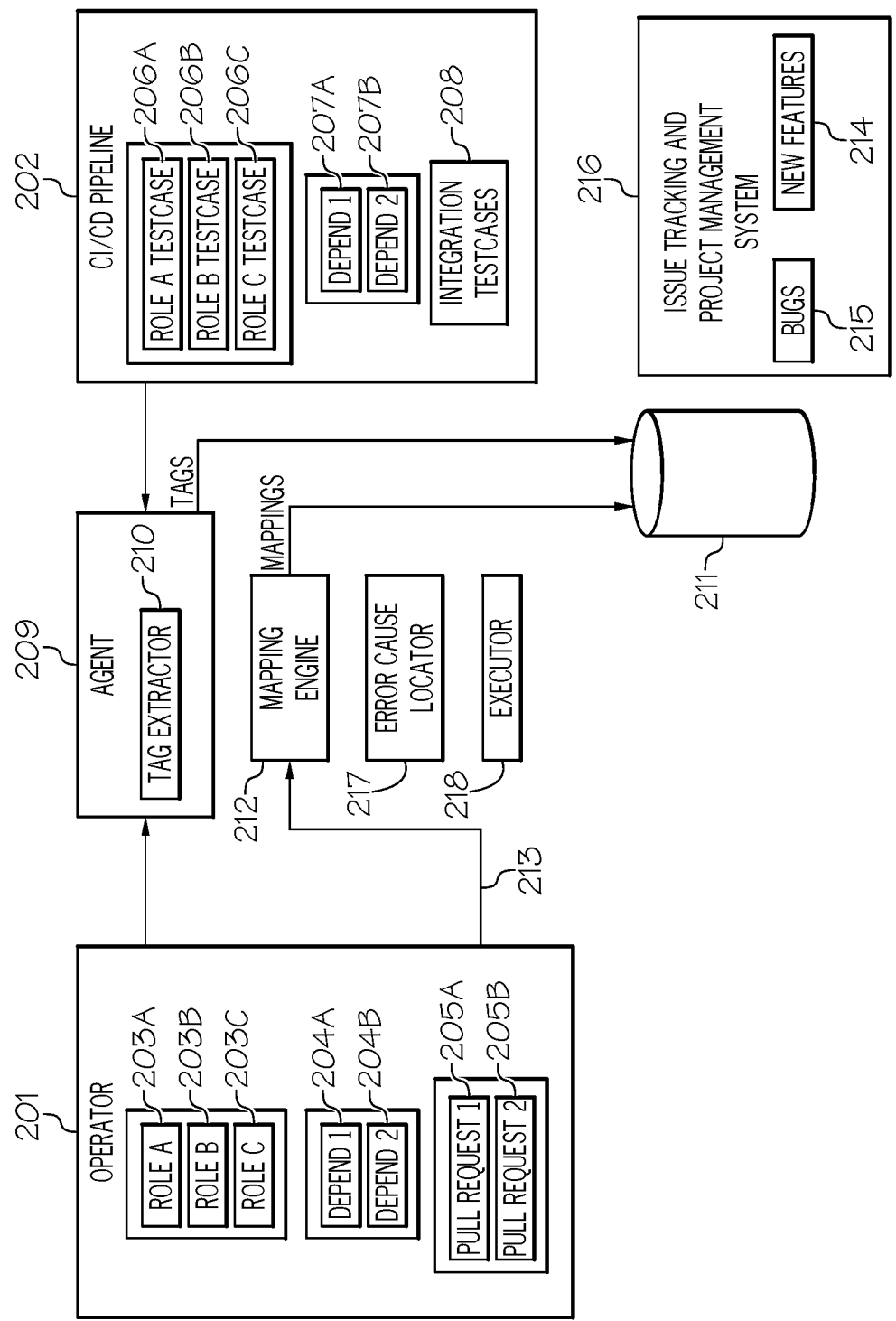
FIG. 2 illustrates the architecture of the container orchestration system in accordance with an embodiment of the present disclosure.

Referring now to FIG. 2, in conjunction with FIG. 1, FIG. 2 illustrates the architecture of container orchestration system 102 in accordance with an embodiment of the present disclosure.

As shown in FIG. 2, container orchestration system 102 includes an operator 201. Operator 201, as used herein, refers to a client of container orchestration system's application programming interface (API) that acts as a controller for a custom resource.

In one embodiment, operator 201 (e.g., Kubernetes® operator) is a method of packaging, deploying and managing an application (e.g., Kubernetes® application). In one embodiment, operator 201 is an application-specific controller that extends the functionality of the container orchestration system's API to create, configure, and manage instances of complex applications on behalf of a user.

In one embodiment, operator 201 includes domain or application-specific knowledge to automate the entire life cycle of the software it manages.

In one embodiment, operator 201 is a custom controller that uses custom resources (CR) to manage applications and their components. High-level configuration and settings are provided by the user within a CR. In one embodiment, operator 201 translates the high-level directives into the low level actions based on best practices embedded within the operator's logic.

A custom resource is the API extension mechanism in container orchestration system 102. A custom resource definition (CR)) defines a CR and lists out all of the configurations available to users of operator 201.

In one embodiment, operator 201 watches a CR type and takes application-specific actions to make the current state match the desired state in that resource.

In one embodiment, operator 201 introduces new object types through custom resource definitions. Custom resource definitions can be handled by the API of container orchestration system 102 as built-in objects, including interactions via a command line tool (e.g., kubecti) and inclusion in role-based access control (RBAC) policies.

In one embodiment, operator 201 continues to monitor its application as it runs, and can back up data, recover from failures, and upgrade the application over time, automatically.

Actions performed by operator 201 include, but not limited to, scaling a complex application, application version upgrades, managing kernel modules for nodes in a computational cluster with specialized hardware, etc. Other examples include deploying an application on demand, taking and restoring backups of that application's state, handling upgrades of the application code alongside related changes, such as database schemas or extra configuration settings, publishing a service to applications that do not support APIs to discover them, simulating failure in all or part of a cluster to test its resilience, etc. Another example of an operation performed by operator 201 is the installation of a series of software products that are interrelated and integrated in container orchestration system 102. The operator's CI/CD 202 then checks the quality of these installed multiple software products that have dependencies between them.

In one embodiment, operator 201 includes roles 203A-203C (identified as "Role A," "Role B," and "Role C," respectively, in FIG. 2). Roles 203A-203C may collectively or individually be referred to as roles 203 or role 203, respectively. Role 203, as used herein, refers to setting permissions with a particular namespace. In particular, the purpose of role 203A is to deploy software product A, the purpose of role 203B is to deploy software product B and the purpose of role 203C is to deploy software product C. In one embodiment, in connection with deploying software products, role 203 sets permissions in connection with files, templates, tasks, handlers, variables, defaults, metadata, etc.

Furthermore, operator 201 includes a storage of dependencies amongst the software products to be deployed, such as the dependencies between software products A, B and C. Such dependencies are stored in depend 1 204A and depend 2 204B, which correspond to data structures, such as tables, which are stored in a storage device of container orchestration system 102. Depends 204A-204B may collectively or individually be referred to as depends 204 or depend 204, respectively.

Additionally, operator 201 includes pull requests, such as pull request 1 205A and pull request 2 205B, which informs CI/CD pipeline 202 regarding the changes to the software products to be pushed. In particular, pull requests 205A, 205B are requests to merge one or more commits into a different branch, where a commit is a discrete change, such as to one or more files. Pull requests 205A, 205B may collectively or individually be referred to as pull requests 205 or pull request 205, respectively.

While FIG. 2 illustrates a particular number of roles 203, depends 204, pull requests 205 for operator 201, operator 201 may include any number of roles 203, depends 204 and pull requests 205.

Furthermore, as shown in FIG. 2, container orchestration system 102 includes a CI/CD pipeline 202, which is configured to validate the software products that are deployed on the platform of container orchestration system 102 by operator 201. For example, operator 201 may install a series of software products, such as software products A, B and C, that are interrelated and integrated in container orchestration system 102. CI/CD pipeline 202 then checks the quality of these installed software products that have dependencies between them. Such checking may be performed via roles, such as role A testcase 206A, role B testcase 206B and role C testcase 206C. Roles 206A-206C may collectively or individually be referred to as roles 206 or role 206, respectively. Role 206, as used herein, refers to setting permissions with a particular namespace. In particular, the purpose of role 206A is to validate software product A, the purpose of role 206B is to validate software product B and the purpose of role 206C is to validate software product C. In one embodiment, in connection with validating software products, role 206 sets permissions in connection with files, templates, tasks, handlers, variables, defaults, metadata, etc.

Additionally, as with operator 201, CI/CD pipeline 202 includes a storage of dependencies amongst the software products to be validated, such as the dependencies between software products A, B and C. Such dependencies are stored in depend 1 207A and depend 2 207B, which correspond to data structures, such as tables, which are stored in a storage device of container orchestration system 102. Depends 207A-207B may collectively or individually be referred to as depends 207 or depend 207, respectively.

Furthermore, as shown in FIG. 2, CI/CD pipeline 202 includes an integration of the testcases 208, which checks if the components and services all work together. In particular, integration of the testcases 208 is testing that is focused and executed during the CI process and orchestrated by CI tools, such as CircleCI®, Travis CI®, Drone, etc., which accounts for the build, packaging and publishing of artifacts.

Test failures or successes will have happen in the CI portion of the CI/CD pipeline. A CI pipeline that runs will get a "green build" and perhaps build a package. A continuous delivery pipeline that succeeds might create a ticket for someone to do any final checks—after the checks pass, the decision-maker could "push" code to production in one step. A continuous deployment pipeline will push to production on success. On failure, all systems will turn, stop, and send notifications to the offenders and related managers.

Those successes and failures may result in notifications in the form of a text file with results, an exit code from the test application, or text sent to STDOUT that can be redirected or captured. The CI pipeline needs to get those results in order to light up "RED" (failing) or "GREEN" (everything passes).

While FIG. 2 illustrates a particular number of roles 206, depends 207 and integration of the testcases 208 for CI/CD pipeline 202, CI/CD pipeline 202 may include any number of roles 206, depends 207 and integration of the testcases 208.

As previously discussed, there is not currently a means for effectively identifying the failure in a CI/CD pipeline involving an operator installing multiple software products that have dependencies between them in a container orchestration system.

The embodiments of the present disclosure provide a means for effectively identifying the failure in a CI/CD pipeline involving an operator installing multiple software products that have dependencies between them in a container orchestration system by mapping the code of tagged tasks, templates and/or variables between the operator and the CI/CD pipeline as well as mapping the code of tagged tasks, templates and/or variables between the roles in the operator thereby enabling dependences and interactions between the operator and the CI/CD pipeline or between the roles inside the operator to be discovered. By discovering such dependencies and interactions, the root cause of a failure in the CI/CD pipeline may be discovered. In one embodiment, such discoveries are obtained using the following software modules of container orchestration system 102, such as agent 209.

Agent 209 is configured to analyze existing and/or new code for operator 201 and CI/CD pipeline 202 in order to extract tags for tasks, templates and/or variables of roles 203, 206. A task, as used herein, refers to a unit of execution or a unit of work. A template, as used herein, refers to a special type of form, pattern or document that is used to create other forms, patterns or documents. A variable, as used herein, is used to store information to be referenced and manipulated in a computer program.

Tags, as used herein, refer to a type of metadata assigned to the tasks, templates and/or variables of roles 203, 206. In one embodiment, such tags that are assigned to the tasks, templates and/or variables of roles 203, 206 are extracted by tag extractor 210 of agent 209. In one embodiment, tag extractor 210 extracts tags for tasks, templates and/or variables of roles 203, 206 based on analyzing the code of operator 201 and CI/CD pipeline 202. Based on such an analysis, tags assigned to tasks, templates and/or variables are identified as discussed below. In one embodiment, static analysis (examining the code without executing the application) is performed on the code of operator 201 and CI/CD pipeline 202 to identify the tags of tasks, templates and/or variables of roles 203, 206, respectively. In an alternative embodiment, dynamic analysis (testing and evaluating of an application during runtime) is performed on the code of operator 201 and CI/CD pipeline 202 to identify the tags of tasks, templates and/or variables of roles 203, 206, respectively.

In one embodiment, the tags of tasks, templates and/or variables are identified from analyzing the code of operator 201 and CI/CD pipeline 202 by identifying keywords (e.g., tasks, vars, templates) in the code. For example, tags associated with tasks may be identified via the use of "tasks" in the code. For instance, tags associated with tasks may be identified in the following line of code involving a YML file: "file: roles/frontend/tasks/main.yml." In another example, tags associated with variables may be identified via the use of "vars" in the code. For instance, tags associated with variables may be identified in the following line of code involving a YML file: "group_vars/prod.yml." In a further example, tags associated with templates may be identified via the use of "templates" in the code. For instance, tags associated with templates may be identified in the following line of code involving a YML file: "roles/frontend/templates/config.ini.j2." In one embodiment, tag extractor 210 utilizes natural language processing to identify the terms in the code of operator 201 and CI/CD pipeline 202 that are used to identify the tags of tasks, templates and/or variables of roles 203, 206, where such terms reside in a data structure (e.g., table) populated by an expert. In one embodiment, such a data structure resides within a storage device of container orchestration system 102.

In one embodiment, the tags of tasks, templates and/or variables are identified from analyzing the code of operator 201 and CI/CD pipeline 202 using a syntax analysis tree, such as to identify verbs and nouns. In another embodiment, the tags of tasks, templates and/or variables are identified from analyzing the code of operator 201 and CI/CD pipeline 202 by identifying the tasks' own tags as discussed below in connection with FIG. 3.

Figure 3:
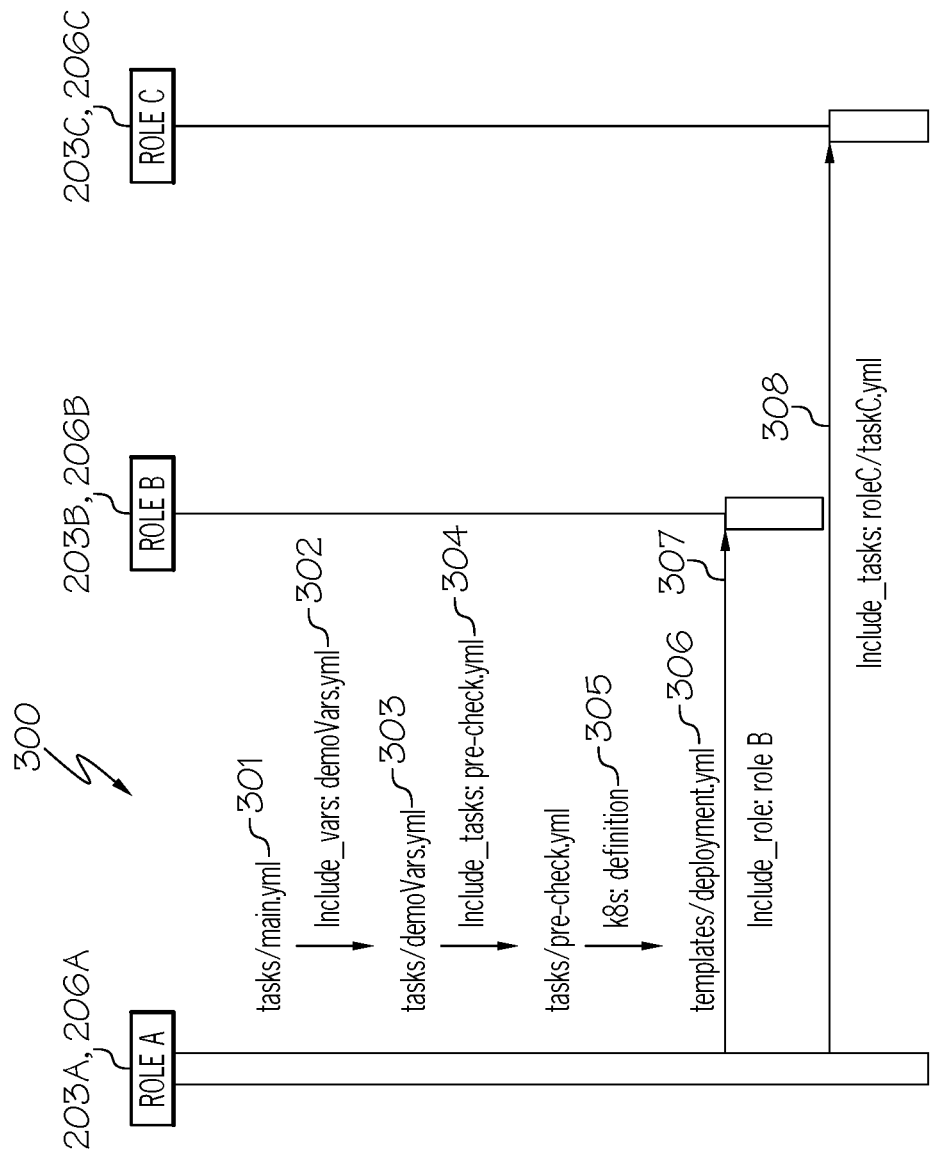
FIG. 3 illustrates the various means for extracting the tags of tasks, templates and/or variables in the code of the operator and the CI/CD pipeline in accordance with an embodiment of the present disclosure.

FIG. 3 illustrates the various means for extracting the tags of tasks, templates and/or variables in the code of operator 201 and CI/CD pipeline 202 in accordance with an embodiment of the present disclosure. In one embodiment, such tags are extracted by scanning the files of roles 203, 206 of operator 201, CI/CD pipeline 202, respectively.

Referring to FIG. 3, tag extractor 210 scans the files of roles 203A, 206A where a partial sequence 300 of such a scan is shown in FIG. 3. In such a scan, tags of tasks, templates and/or variables are extracted from the code of operator 201 and CI/CD pipeline 202, such as written in Ansible®, such as shown by elements 301-304 in the scan sequence depicted in FIG. 3. For example, the task yml file 301 ("tasks/main.yml") includes the variable yml file 302 ("Include_vars: demoVars.yml") from which tags can be extracted by tag extractor 210, such as role A, var (for variable type of tag), post (post phase), route (object type), etc. In one embodiment, such tags are extracted by tag extractor 210 by performing a static analysis of such a file (examining the file without viewing the actual instructions) or a dynamic analysis of such a file (execute file in an isolated virtual environment). In another example, the task yml file 303 ("tasks/demoVars.yml") includes the task yml file 304 ("Include_tasks: pre-check.yml") from which tags can be extracted by tag extractor 210, such as pre (pre phase), task (for task type of tag), check (action), etc. As discussed above, such tags are extracted by tag extractor 210 by performing a static analysis or a dynamic analysis of such a file.

In another embodiment, such tags of tasks, templates and/or variables may be extracted by analyzing the code of operator 201 and CI/CD pipeline 202 by identifying keywords (e.g., k8s and k8s_info modules), such as shown in FIG. 3. For instance, the keyword k8s is found in the line of code 305 ("k8s: definition"), which points to the template yml file 306 ("templates/deployment.yml") from which tags can be extracted by tag extractor 210, such as role A (owner), template (for template type of tag), deploy (phase), etc. As discussed above, such tags are extracted by tag extractor 210 by performing a static analysis or a dynamic analysis of such a file.

Furthermore, as shown in FIG. 3, tag extractor 210 scans the files of other roles, such as roles 203B-203C, 206B-206C, via the use of include statements, such as the include-role loop 307 (e.g., "Include_role: role B") or the include-task statement 308 (e.g., "Include_tasks: roleC/taskC.yml").

In one embodiment, such tags include various classifications, such as the type (e.g., task, template and variable).

In one embodiment, such tags include the classification of the phase ("pre" for pre-deployment, "deploy" for deployment and "post" for post-deployment). In another embodiment, such tags include the classification of an object name or object type (e.g., configmap/route/secret . . . ). In another embodiment, such tags are classified based on actions (e.g., add, delete, modify, check) or the owner (e.g., role A 203A, 206A).

In one embodiment, the output of tag extractor 210 is stored in tables, such as shown in FIGS. 4A-4C.

FIG. 4A illustrates a table 401 for storing the tags of tasks in accordance with an embodiment of the present disclosure. As shown in FIG. 4A, table 401 includes a column 402 ("Task ID") for the identifier of the task, a column 403 ("Task Name") for the name of the task, a column 404 ("Tags") for the tags associated with such a task, a column 405 ("File Name and Path") for the file name and path for such a task, a column 406 ("Variables Used") for the variables used in connection with such a task and a column 407 ("Template Used") for the template used in connection with such a task.

FIG. 4B illustrates a table 408 for storing the tags of templates in accordance with an embodiment of the present disclosure. As shown in FIG. 4B, table 408 includes a column 409 ("Template ID") for the identifier of the template, a column 410 ("Template Name") for the name of the template, a column 411 ("Tags") for the tags associated with such a template and a column 412 ("File Name and Path") for the file name and path for such a template.

FIG. 4C illustrates a table 413 for storing the tags of variables in accordance with an embodiment of the present disclosure. As shown in FIG. 4C, table 413 includes a column 414 ("Var ID") for the identifier of the variable, a column 415 ("Var Name") for the name of the variable, a column 416 ("Tags") for the tags associated with such a variable and a column 417 ("File Name and Path") for the file name and path for such a variable.

In one embodiment, the information stored in such tables, tables 401, 408 and 413, is populated by tag extractor 210 using various software tools, including, but not limited to, EasyCatalog, PivotTable, etc.

In one embodiment, such tables, tables 401, 408 and 413, apply to the tags of tasks, templates and/or variables for both operator 201 and CI/CD pipeline 202. In one embodiment, operator 201 and CI/CD pipeline 202 each have their own tables 401, 408 and 413.

Referring to FIG. 2, upon extracting the tags for the tasks, templates and/or variables of roles 203, 206 of operator 201 and CI/CD pipeline 202, respectively, such tags may be stored in a repository 211 (also referred to as the "knowledge center").

Container orchestration system 102 further includes a mapping engine 212 configured to map the code of tagged tasks, templates and/or variables of operator 201 with the code of tagged tasks, templates and/or variables of CI/CD pipeline 202 using the extracted tags forming "mappings." "Mappings," as used herein, refer to associating particular code of operator 201 with particular code of CI/CD pipeline 202.

In one embodiment, mapping engine 212 utilizes two different types of mappings. One type is to map the code of tagged tasks, templates and/or variables between operator 201 and CI/CD pipeline 202. Another type of mapping involves mapping the code of tagged tasks, templates and/or variables between roles 203 of operator 201. In this manner, dependencies and interactions between operator 201 and CI/CD pipeline 202 or between roles 203 inside operator 201 can be discovered. By discovering such dependencies and interactions, the root cause of a failure in the CI/CD pipeline 202 may be discovered as discussed further below.

In one embodiment, such mappings involve mapping rules established by an expert. For example, in one embodiment, the pseudocode for an illustrative mapping rule for mapping the code of tagged tasks, templates and/or variables between operator 201 and CI/CD pipeline 202 with the same name for roles 203, 206, respectively, is the following:

```
If tag.ojbectName is same and tag.objectType is same {
    If A.tag.action=create/delete/update and B.tag.action-check/get{
      add their mapping
    } else if A.tag.action=check and B.tag.action=check and object is
    external dependency{
      add their mapping
    }
}
```

Hence, in one embodiment, if the name and type of the tagged object for roles 203, 206 are the same, and if the action of the tagged object for role 203 corresponds to a create, delete or update action and the tagged object for role 206 corresponds to a check or get action, then such codes in operator 201 and CI/CD pipeline 202 are mapped together. For example, if the tags of a task of software product C in operator 201 are update, product_links and task and the tags of a task of software product C in CI/CD pipeline 202 are check, productB_links and task, then the code (e.g., tasks/update.yml and tasks/healthy-check-curl.yml) involving such tags for operator 201 and CI/CD pipeline 202, respectively, are mapped to each other.

In another embodiment, if the name and type of the tagged object for roles 203, 206 are the same, and if the action of the tagged object for role 203 corresponds to a check action and the tagged object for role 206 corresponds to a check and the object has external dependency, then such codes (e.g., job-check.yml and pod-checkyml) in operator 201 and CI/CD pipeline 202, respectively, are mapped together.

In one embodiment, the pseudocode for an illustrative mapping rule for mapping the code of tasks, templates and/or variables between roles 203 in operator 201 is the following:

```
If tag.ojbectName is same and tag.objectType is same {
    add their mapping
}
```

Hence, in one embodiment, if the tagged objects for roles 203 of operator 201 have the same name and type, then the code for such roles 203 are mapped to each other. For example, if the tags of a task of software product A in operator 201 are update, init job, productB_configmap and task and the tags of a task of software product B in operator 201 are create, productB_configmap and task, then the tagged objects for roles 203 have the same name and type (e.g., productB_configmap). As a result, the code (e.g., post-checks.yml and post-main.yml) for such tagged objects between roles 203 are mapped to each other.

In one embodiment, such mappings are stored in repository 211 by mapping engine 212. Furthermore, in one embodiment, such stored mappings include the tags (e.g., owner, such as role A, type of tag, such as task) associated with the code. For example, a mapping stored in repository 211 may have role 203A and task A (associated with code "post-checks.yml") associated with role 206A and task B (associated with code "post-main.yml").

In one embodiment, pull requests 205 may result in actions or results in CI/CD pipeline 202. Such actions or results are mapped together by mapping engine 212. Such mappings may provide a reference for future mappings. For example, a pull request 205 may correspond to an action (e.g., update in CI/CD pipeline 202) received by mapping engine 212 as shown by line 213. Hence, there may be a mapping between a pull request 205 in operator 201 and an action (e.g., update) in CI/CD pipeline 202. Such mappings may be stored in repository 211 by mapping engine 212.

Additionally, in one embodiment, pull requests 205 may involve new features or fixes for software bugs (errors, flaws or faults in the design, development or operation of computer software that causes it to produce an incorrect or unexpected result or to behave in unintended ways). When such new features or fixes for software bugs are tested in CI/CD pipeline 202, and the test was successfully completed in CI/CD pipeline 202, then such new features 214 and bugs 215 may be stored in issue tracking and project management system 216 (discussed further below). Furthermore, in one embodiment, a new test path may be added to CI/CD pipeline 202. Alternatively, when such a test results in a failure in CI/CD pipeline 202, an analysis, such as a static or dynamic analysis, is performed on CI/CD pipeline 202 in which the bug 215 is reported to issue tracking and project management system 216. Such features and fixes for software bugs as well as the test results in CI/CD pipeline 202 are mapped together, where such mappings are stored in repository 211.

Furthermore, in one embodiment, mappings may involve historical failures in CI/CD pipeline 102, which may be stored in repository 211 by mapping engine 212. For example, pull requests 205 for regression, a new role or for updating code (code changes) of a software product with a dependency component which resulted in a failure in CI/CD pipeline 202 may be mapped to failures in CI/CD pipeline 202. Such mappings may be stored in repository 211 by mapping engine 212 which may be used as a reference for future analysis involving the identification of the root cause of a failure in CI/CD pipeline 202.

After the tags extracted by tag extractor 210 and mappings created by mapping engine 212 have been stored in repository 211, container orchestrations system 102 is configured to identify a failure that occurs in CI/CD pipeline 202. In one embodiment, when a failure occurs in CI/CD pipeline 202, a notification of such a failure may be received by issue tracking and project management system 216.

In one embodiment, issue tracking and project management system 216 receives a notification of a test failure in the form of a text file with results, an exit code from the test application, or text sent to STDOUT that can be redirected or captured. Upon receiving such a notification, issue tracking and project management system 216 informs error cause locator 217 regarding the test failure, which in turn, identifies the root cause of such a failure in CI/CD pipeline 202 as discussed below.

In one embodiment, error cause locator 217 receives a role and a task associated with the failure from CI/CD pipeline 202. For example, the test failure may have occurred during a testcase to validate software product C by role C 206C involving the task of "check configmap." Such information may be provided to error cause locator 217 by issue tracking and project management system 216, which tracks failures occurring in CI/CD pipeline 202.

In one embodiment, error cause locator 217 searches the mappings stored in repository 211 to identify the role 203 and task associated with the received role 206 and task from the failure of CI/CD pipeline 202. For example, a mapping stored in repository 211 may have role 203C and task C associated with role 206C and task B. In one embodiment, such searching may be performed by error cause locator 217 utilizing natural language processing, where error cause locator 217 searches the mappings stored in repository 211 that match within a threshold degree of similarity the received role 206 and task from the failure of CI/CD pipeline 202.

After identifying such a mapping, error cause locator 217 searches for an error of the identified role 203 (e.g., role 203C) of operator 201 in a log file of operator 201. A "log file," as used herein, refers to a file that records events that occurred in connection with operator 201. For example, the log file may include an error message involving role 203C. For instance, a line (e.g., line number 422) in the log file may state "role C/tasks/check configmap ("ERROR")." Such an error corresponds to the root cause of the failure in CI/CD pipeline 202. Hence, upon error cause locator 217 identifying the error of the role 203 (e.g., role 203C) of operator 201 in the log file of operator 201 associated with the role 206 (e.g., role 206C) from the failure of CI/CD pipeline 202, error cause locator 217 identifies the root cause of the failure in CI/CD pipeline 202.

If error cause locator 217 identifies an error involving the identified role (role 203C) of operator 201 in the log file of operator 201, then error cause locator 217 generates a report, which includes the root cause of the failure in CI/CD pipeline 202, such as the line of the error in the log file of operator 201 discussed above. Furthermore, in one embodiment, error cause locator 217 includes one or more actions in the report for addressing the root cause of the failure in CI/CD pipeline 202. In one embodiment, such actions involve updates to the code of CI/CD pipeline 202.

In one embodiment, actions for addressing various root causes of failures in CI/CD pipeline 202 may be pre-populated in a data structure (e.g., table), such as by an expert. For example, such a data structure may include a listing of root causes for various failures in CI/CD pipeline 202 as well as a listing of actions to address such root causes. In one embodiment, such root causes correspond to the errors identified in the log file of operator 201. In one embodiment, error cause locator 217 is configured to match the root cause (e.g., error identified in the log file of operator 201) in such a data structure using natural language processing. In one embodiment, such a data structure resides within the storage device of container orchestration system 102.

If, however, error cause locator 217 does not identify an error in the log file of operator 201 in connection with the identified role 203 of operator 201, then error cause locator 217 searches the mappings stored in repository 211 to identify an internal task of operator 201 that maps to the task (e.g., "check configmap") associated with the failure from CI/CD pipeline 202. An "internal task," as used herein, refers to a task of a role 203 (e.g., role A) involving a software product upon which the failed software product is dependent therefrom.

For example, a mapping stored in repository 211 may have role 203A involving the task of "check configmap" associated with the task from the failure of CI/CD pipeline 202 (e.g., role 206C involving the task of "check configmap"). In one embodiment, such searching may be performed by error cause locator 217 utilizing natural language processing, where error cause locator 217 searches the mappings stored in repository 211 for a mapping that includes a task that matches within a threshold degree of similarity the received task from the failure of CI/CD pipeline 202. Upon identifying such a mapping, such identified mapping may include an internal task of operator 201 that maps to the received task (e.g., "check configmap") from the failure of CI/CD pipeline 202.

If such a mapping is identified, then error cause locator 217 searches for an error of the identified internal task (e.g., "check configmap") of operator 201 in the log file of operator 201. For example, the log file may include an error message involving the task "check configmap." For instance, a line (e.g., line number 722) in the log file may state "role A/tasks/check configmap ("ERROR")." In such an example, the root cause of the failure in CI/CD pipeline 202 was due to a dependency with another software product. For example, the error in CI/CD pipeline 202 involved role 206C, with the role of validating software product C. However, there was no error identified in the log file of operator 201 associated with role 203C, which is mapped to role 206C, since the root cause of the error does not involve software product C. Instead, the root cause of such a failure may be due to a change in software product A, in which software product C depends upon software product B which depends upon software product A. The root cause of a failure in CI/CD pipeline 201 involving a dependency with another software product may be discovered by error cause locator 217 by locating a mapping of the task ("check configmap") involved in the failure of CI/CD pipeline 201 with an internal task of operator 201, in which an error in the log file of operator 201 involving such a task is identified. For example, a line (e.g., line number 722) in the log file may state "role A/tasks/check configmap ("ERROR")" indicating that the error was a result of an error with respect to software product A (role A is tasked for deploying software product A). Such an error would not have previously been captured since the error involved a dependency upon another software product.

Furthermore, such an error corresponds to the root cause of the failure in CI/CD pipeline 202. Hence, upon error cause locator 217 identifying the error of the internal task (e.g., "check configmap") of operator 201 in the log file of operator 201 associated with the task (e.g., "check configmap") from the failure of CI/CD pipeline 202, error cause locator 217 identifies the root cause of the failure in CI/CD pipeline 202.

After error cause locator 217 identifies the error of the task (e.g., "check configmap") of operator 201 in the log file of operator 201 associated with the task (e.g., "check configmap") from the failure of CI/CD pipeline 202, then error cause location 217 generates a report, which includes the root cause of the failure in CI/CD pipeline 202, such as the line of the error in the log file of operator 201 discussed above. Furthermore, in one embodiment, error cause locator 217 includes one or more actions in the report for addressing the root cause of the failure in CI/CD pipeline 202 as discussed above.

If, however, error cause locator 217 does not identify an error involving the identified role (role 203A) and/or task (e.g., "check configmap") of operator 201 in the log file of operator 201, then error cause locator 217 generates a report indicating that the root cause of the failure in CI/CD pipeline 202 could not be determined.

In one embodiment, the failures and actions listed in the reports generated by error cause locator 217 are stored in repository 211.

Container orchestration system 102 further includes an executor 218 configured to receive the report from error cause locator 217 and execute or perform the actions listed in the report.

For example, in one embodiment, one of the actions may be to update the code of CI/CD pipeline 202. Furthermore, in one embodiment, one of the actions may be to schedule a regression test of the full or a partial selection of already executed test cases by roles 206 that are re-executed to ensure existing functionalities function properly. In one embodiment, such a regression test is performed after the actions in the report have been performed by executor 218, such as updates to the code of CI/CD pipeline 202. In one embodiment, executor 218 uses various software tools for implementing such actions, including, but not limited to, Collaborator®, Gerritt, Codestriker, Rhodecode, etc.

In one embodiment, executor 218 is configured to send such reports generated by error cause locator 217 to a developer, such as a user of software development system 102.

A further description of these and other features is provided below in connection with the discussion of the method for identifying the root cause of failures in a continuous integration and continuous delivery (CI/CD) pipeline involving an operator installing multiple software products that have dependencies between them in a container orchestration system.

Prior to the discussion of the method for identifying the root cause of failures in a CI/CD pipeline, such as CI/CD pipeline 202, involving an operator, such as operator 201, installing multiple software products that have dependencies between them in a container orchestration system, such as container orchestration system 102, a description of an embodiment of a hardware configuration of container orchestration system 102 is provided below in connection with FIG. 5.

Figure 5:
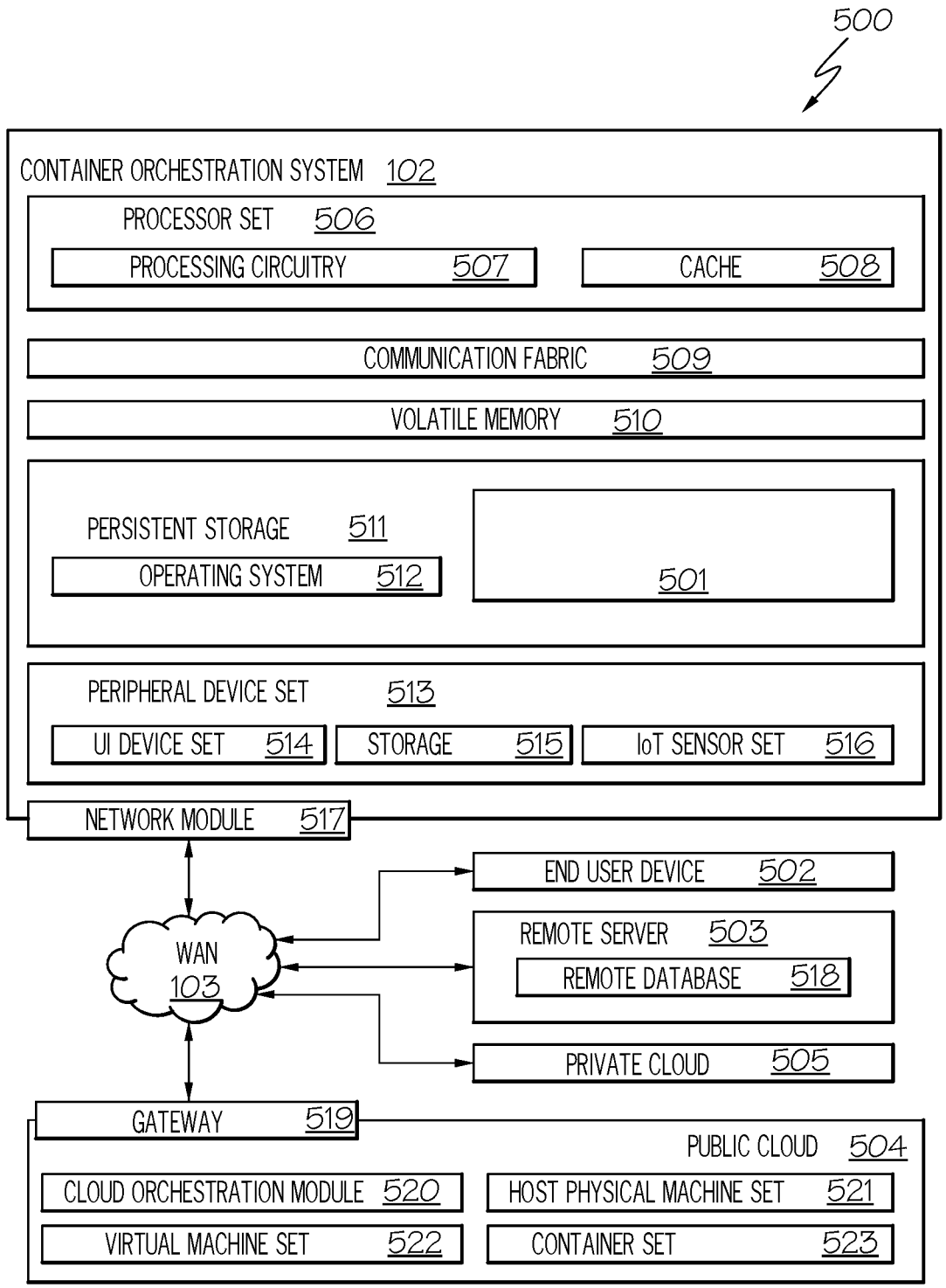
FIG. 5 illustrates an embodiment of the present disclosure of the hardware configuration of the container orchestration system which is representative of a hardware environment for practicing the present disclosure.

Referring now to FIG. 5, in conjunction with FIG. 1, FIG. 5 illustrates an embodiment of the present disclosure of the hardware configuration of container orchestration system 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the inventive methods, such as identifying the root cause of failures in a CI/CD pipeline, such as CI/CD pipeline 202, involving an operator, such as operator 201, installing multiple software products that have dependencies between them in a container orchestration system, such as container orchestration system 102. In addition to block 501, computing environment 500 includes, for example, container orchestration system 102, network 103, such as a wide area network (WAN), end user device (EUD) 502, remote server 503, public cloud 504, and private cloud 505. In this embodiment, container orchestration system 102 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Container orchestration system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically container orchestration system 102, to keep the presentation as simple as possible. Container orchestration system 102 may be located in a cloud, even though it is not shown in a cloud in FIG. 5. On the other hand, container orchestration system 102 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto container orchestration system 102 to cause a series of operational steps to be performed by processor set 506 of container orchestration system 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of container orchestration system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In container orchestration system 102, the volatile memory 510 is located in a single package and is internal to container orchestration system 102, but, alternatively or additionally, the volatile memory may be distributed over multiple packages and/or located externally with respect to container orchestration system 102.

Persistent Storage 511 is any form of non-volatile storage for computers that is now known or to be developed in the future. The non-volatility of this storage means that the stored data is maintained regardless of whether power is being supplied to container orchestration system 102 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of container orchestration system 102. Data communication connections between the peripheral devices and the other components of container orchestration system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where container orchestration system 102 is required to have a large amount of storage (for example, where container orchestration system 102 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows container orchestration system 102 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to container orchestration system 102 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates container orchestration system 102), and may take any of the forms discussed above in connection with container orchestration system 102. EUD 502 typically receives helpful and useful data from the operations of container orchestration system 102. For example, in a hypothetical case where container orchestration system 102 is designed to provide a recommendation to an end user, this recommendation would typically be communicated from network module 517 of container orchestration system 102 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to container orchestration system 102. Remote server 503 may be controlled and used by the same entity that operates container orchestration system 102. Remote server 503 represents the machine(s) that collect and store helpful and useful data for use by other computers, such as container orchestration system 102. For example, in a hypothetical case where container orchestration system 102 is designed and programmed to provide a recommendation based on historical data, then this historical data may be provided to container orchestration system 102 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to identify the root cause of failures in a CI/CD pipeline, such as CI/CD pipeline 202, involving an operator, such as operator 201, installing multiple software products that have dependencies between them in a container orchestration system, such as container orchestration system 102. In one embodiment, such components may be implemented in hardware. The functions discussed above performed by such components are not generic computer functions. As a result, container orchestration system 102 is a particular machine that is the result of implementing specific, non-generic computer functions.

In one embodiment, the functionality of such software components of container orchestration system 102, including the functionality for identifying the root cause of failures in a CI/CD pipeline (e.g., CI/CD pipeline 202) involving an operator (e.g., operator 201) installing multiple software products that have dependencies between them in container orchestration system 202 may be embodied in an application specific integrated circuit.

As stated above, container orchestration systems are designed for automation, such as automating a task beyond what container orchestration systems typically provide. Such automation may be performed via the use of "operators." Operators are clients of the container orchestration system's application programming interface (API) that act as controllers for a custom resource. Examples of operations performed by operators include: deploying an application on demand, taking and restoring backups of that application's state, handling upgrades of the application code alongside related changes, such as database schemas or extra configuration settings, publishing a service to applications that do not support APIs to discover them, simulating failure in all or part of a cluster to test its resilience, etc. Another example of an operation performed by operators is the installation of a series of software products that are interrelated and integrated in the container orchestration system. The operator's CI/CD then checks the quality of these installed multiple software products that have dependencies between them. As discussed above, a CI/CD pipeline automates the software delivery process. To avoid delivery delays, failures in the CI/CD pipeline need to be resolved quickly. For a simple project, such failures in the CI/CD pipeline may be resolved by implementing a revert commend, which corresponds to a forward-moving undo operation. However, such a method is not applicable in all cases, such as when failures occur in the CI/CD pipeline involving a series of software products that are interrelated and integrated. For example, when an operator installs a series of software products that are interrelated and integrated in the container orchestration system, the operator's CI/CD then checks the quality of these installed software products that have dependencies between them. However, testing the quality of multiple software products that have dependencies between them is complicated and identifying the root cause of a failure involving such software products may not be easy to capture. For instance, if an operator installed software products A, B and C that have dependencies between them and a failure occurred in the operator's CI/CD process involving a function test of software product C, the root cause may not be able to be identified, such as by implementing a revert command. For example, if software product C depends upon software product B which depends upon software product A, and the root cause of the failure was due to a change in software product A, then a revert comment, which corresponds to a forward-moving undo operation, would not capture the change in software product A. As a result, such a failure in the CI/CD process would not be captured. Hence, there is not currently a means for effectively identifying the failure in a CI/CD pipeline involving an operator installing multiple software products that have dependencies between them in a container orchestration system.

Figure 6:
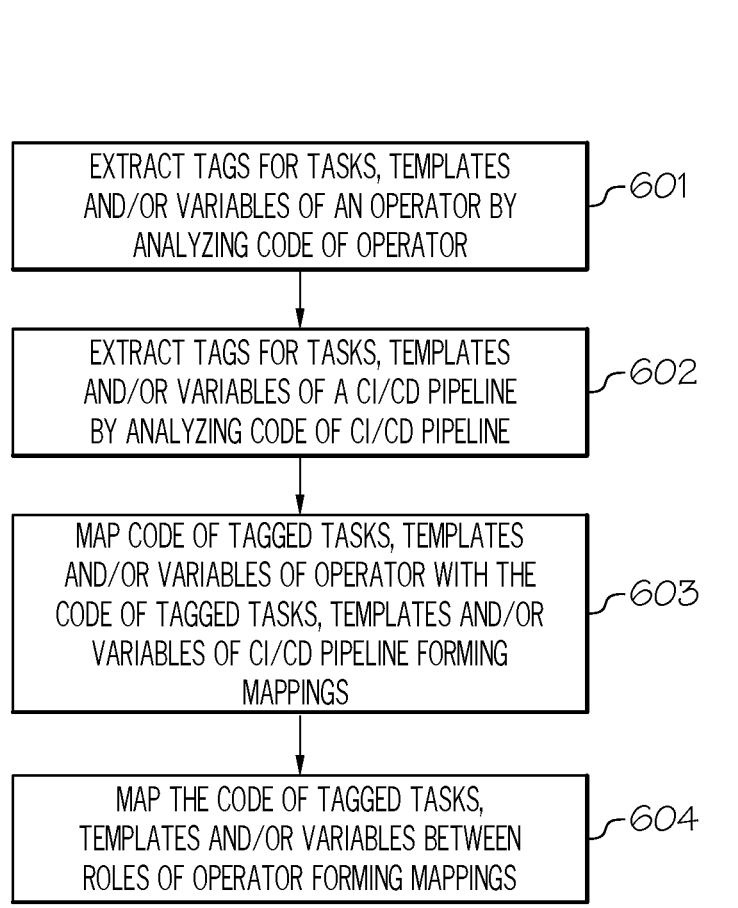
FIG. 6 is a flowchart of a method for populating a repository with mappings and tags in accordance with an embodiment of the present disclosure.
Figure 7:
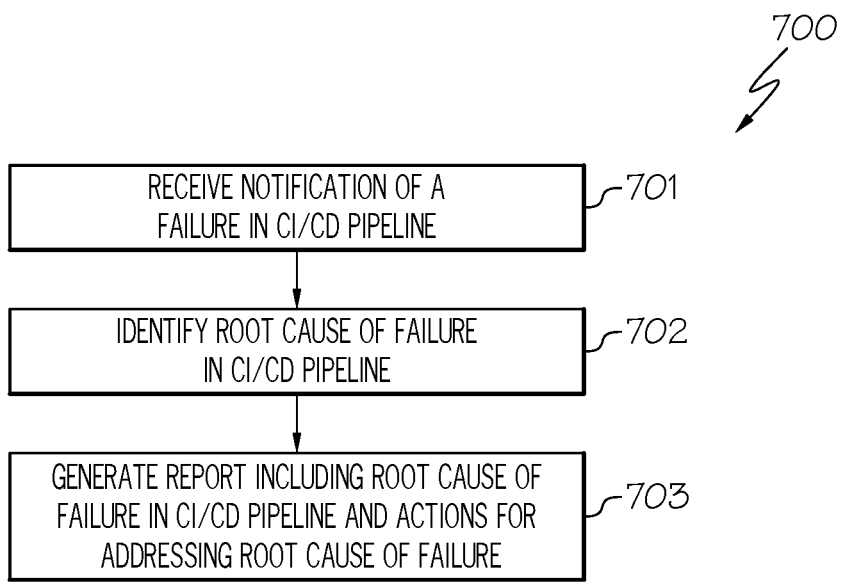
FIG. 7 is a flowchart of a method for handling failures in a CI/CD pipeline involving software products with dependencies between them in accordance with an embodiment of the present disclosure.
Figure 8:
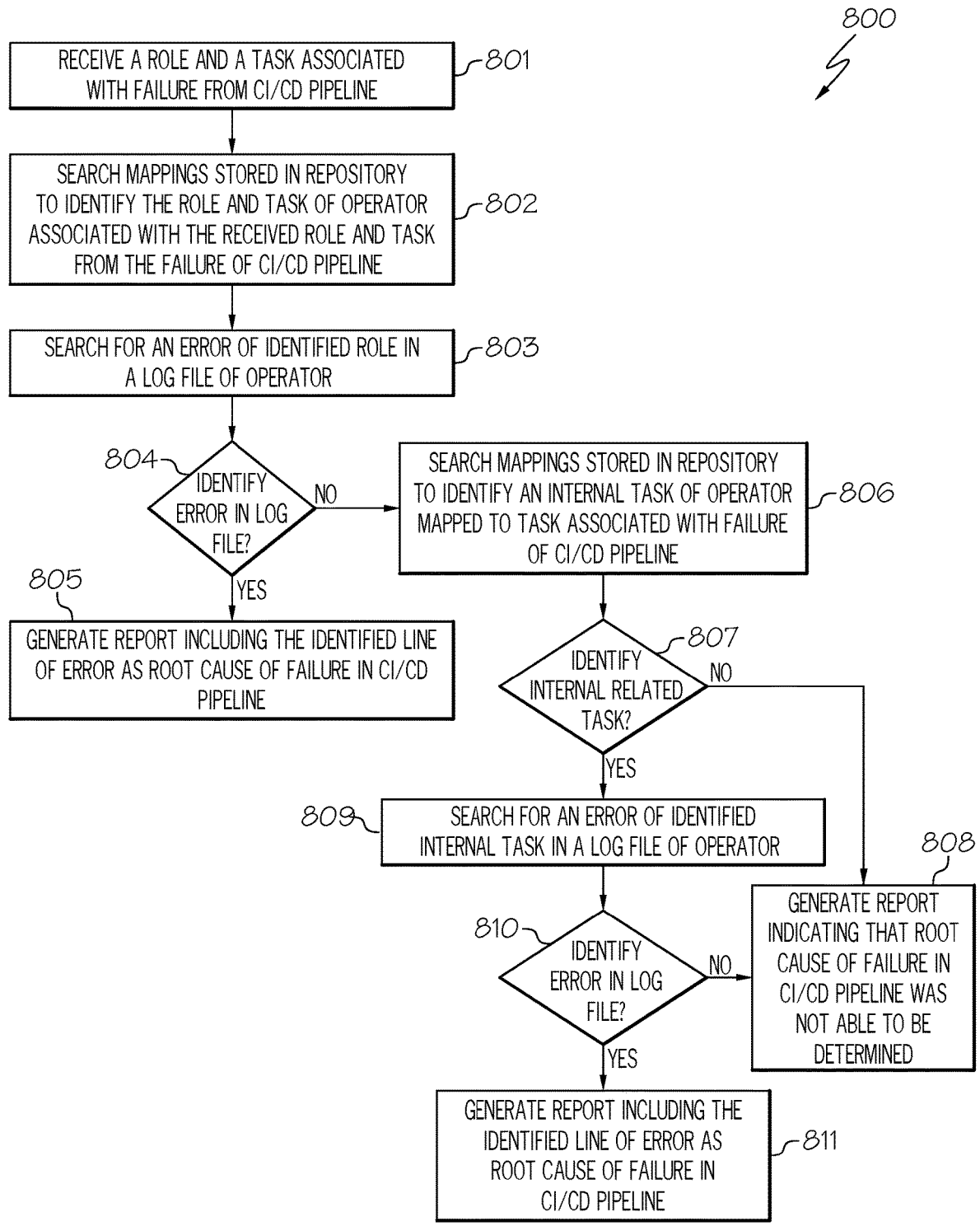
FIG. 8 is a flowchart of a method for identifying the root cause of errors in a CI/CD pipeline, including errors involving software products with dependencies between them, in accordance with an embodiment of the present disclosure.

The embodiments of the present disclosure provide a means for effectively identifying the failure in a CI/CD pipeline involving an operator installing multiple software products that have dependencies between them in a container orchestration system by mapping tagged tasks, templates and/or variables between the operator and the CI/CD pipeline as well as mapping the tagged tasks, templates and/or variables between the roles in the operator thereby enabling dependences and interactions between the operator and the CI/CD pipeline or between the roles inside the operator to be discovered. By discovering such dependencies and interactions, the root cause of a failure in the CI/CD pipeline may be discovered as discussed below in connection with FIGS. 6-8. FIG. 6 is a flowchart of a method for populating a repository with mappings and tags. FIG. 7 is a flowchart of a method for handling failures in a CI/CD pipeline involving software products with dependencies between them. FIG. 8 is a flowchart of a method for identifying the root cause of errors in a CI/CD pipeline, including errors involving software products with dependencies between them.

As stated above, FIG. 6 is a flowchart of a method 600 for populating a repository, such as repository 211, with mappings and tags in accordance with an embodiment of the present disclosure.

Referring to FIG. 6, in conjunction with FIGS. 1-5, in step 601, tag extractor 210 of container orchestration system 102 extracts tags for tasks, templates and/or variables of operator 201 by analyzing the code of operator 201.

In step 602, tag extractor 210 of container orchestration system 102 extracts tags for tasks, templates and/or variables of CI/CD pipeline 202 by analyzing the code of CI/CD pipeline 202.

As discussed above, tags, as used herein, refer to a type of metadata assigned to the tasks, templates and/or variables of roles 203, 206. In one embodiment, such tags that are assigned to the tasks, templates and/or variables of roles 203, 206 are extracted by tag extractor 210 of agent 209. In one embodiment, tag extractor 210 extracts tags for tasks, templates and/or variables of roles 203, 206 based on analyzing the code of operator 201 and CI/CD pipeline 202. Based on such an analysis, tags assigned to tasks, templates and/or variables are identified as discussed below. In one embodiment, static analysis (examining the code without executing the application) is performed on the code of operator 201 and CI/CD pipeline 202 to identify the tags of tasks, templates and/or variables of roles 203, 206, respectively. In an alternative embodiment, dynamic analysis (testing and evaluating of an application during runtime) is performed on the code of operator 201 and CI/CD pipeline 202 to identify the tags of tasks, templates and/or variables of roles 203, 206, respectively.

In one embodiment, the tags of tasks, templates and/or variables are identified from analyzing the code of operator 201 and CI/CD pipeline 202 by identifying keywords (e.g., tasks, vars, templates) in the code. For example, tags associated with tasks may be identified via the use of "tasks" in the code. For instance, tags associated with tasks may be identified in the following line of code involving a YML file: "file: roles/frontend/tasks/main.yml." In another example, tags associated with variables may be identified via the use of "vars" in the code. For instance, tags associated with variables may be identified in the following line of code involving a YML file: "group_vars/prod.yml." In a further example, tags associated with templates may be identified via the use of "templates" in the code. For instance, tags associated with templates may be identified in the following line of code involving a YML file: "roles/frontend/templates/config.ini.j2." In one embodiment, tag extractor 210 utilizes natural language processing to identify the terms in the code of operator 201 and CI/CD pipeline 202 that are used to identify the tags of tasks, templates and/or variables of roles 203, 206, where such terms reside in a data structure (e.g., table) populated by an expert. In one embodiment, such a data structure resides within a storage device (e.g., storage device 511, 515) of container orchestration system 102.

In one embodiment, the tags of tasks, templates and/or variables are identified from analyzing the code of operator 201 and CI/CD pipeline 202 using a syntax analysis tree, such as to identify verbs and nouns. In another embodiment, the tags of tasks, templates and/or variables are identified from analyzing the code of operator 201 and CI/CD pipeline 202 by identifying the tasks' own tags as discussed below in connection with FIG. 3.

As previously discussed, referring to FIG. 3, tag extractor 210 scans the files of roles 203A, 206A where a partial sequence 300 of such a scan is shown in FIG. 3. In such a scan, tags of tasks, templates and/or variables are extracted from the code of operator 201 and CI/CD pipeline 202, such as written in Ansible®, such as shown by elements 301-304 in the scan sequence depicted in FIG. 3. For example, the task yml file 301 ("tasks/main.yml") includes the variable yml file 302 ("Include_vars: demoVars.yml") from which tags can be extracted by tag extractor 210, such as role A, var (for variable type of tag), post (post phase), route (object type), etc. In one embodiment, such tags are extracted by tag extractor 210 by performing a static analysis of such a file (examining the file without viewing the actual instructions) or a dynamic analysis of such a file (execute file in an isolated virtual environment). In another example, the task yml file 303 ("tasks/demoVars.yml") includes the task yml file 304 ("Include_tasks: pre-check.yml") from which tags can be extracted by tag extractor 210, such as pre (pre phase), task (for task type of tag), check (action), etc. As discussed above, such tags are extracted by tag extractor 210 by performing a static analysis or a dynamic analysis of such a file.

In another embodiment, such tags of tasks, templates and/or variables may be extracted by analyzing the code of operator 201 and CI/CD pipeline 202 by identifying keywords (e.g., k8s and k8s_info modules), such as shown in FIG. 3. For instance, the keyword k8s is found in the line of code 305 ("k8s: definition"), which points to the template yml file 306 ("templates/deployment.yml") from which tags can be extracted by tag extractor 210, such as role A (owner), template (for template type of tag), deploy (phase), etc. As discussed above, such tags are extracted by tag extractor 210 by performing a static analysis or a dynamic analysis of such a file.

Furthermore, as shown in FIG. 3, tag extractor 210 scans the files of other roles, such as roles 203B-203C, 206B-206C, via the use of include statements, such as the include-role loop 307 (e.g., "Include_role: role B") or the include-task statement 308 (e.g., "Include_tasks: roleC/taskC.yml").

In one embodiment, such tags include various classifications, such as the type (e.g., task, template and variable).

In one embodiment, such tags include the classification of the phase ("pre" for pre-deployment, "deploy" for deployment and "post" for post-deployment). In another embodiment, such tags include the classification of an object name or object type (e.g., configmap/route/secret . . . ). In another embodiment, such tags are classified based on actions (e.g., add, delete, modify, check) or the owner (e.g., role A 203A, 206A).

In one embodiment, the output of tag extractor 210 is stored in tables, such as shown in FIGS. 4A-4C.

As shown in FIG. 4A, table 401 (table for storing the tags of tasks) includes a column 402 ("Task ID") for the identifier of the task, a column 403 ("Task Name") for the name of the task, a column 404 ("Tags") for the tags associated with such a task, a column 405 ("File Name and Path") for the file name and path for such a task, a column 406 ("Variables Used") for the variables used in connection with such a task and a column 407 ("Template Used") for the template used in connection with such a task.

As shown in FIG. 4B, table 408 (table for storing the tags of templates) includes a column 409 ("Template ID") for the identifier of the template, a column 410 ("Template Name") for the name of the template, a column 411 ("Tags") for the tags associated with such a template and a column 412 ("File Name and Path") for the file name and path for such a template.

As shown in FIG. 4C, table 413 (table for storing the tags of variables) includes a column 414 ("Var ID") for the identifier of the variable, a column 415 ("Var Name") for the name of the variable, a column 416 ("Tags") for the tags associated with such a variable and a column 417 ("File Name and Path") for the file name and path for such a variable.

In one embodiment, the information stored in such tables, tables 401, 408 and 413, is populated by tag extractor 210 using various software tools, including, but not limited to, EasyCatalog, PivotTable, etc.

In one embodiment, such tables, tables 401, 408 and 413, apply to the tags of tasks, templates and/or variables for both operator 201 and CI/CD pipeline 202. In one embodiment, operator 201 and CI/CD pipeline 202 each have their own tables 401, 408 and 413.

In step 603, mapping engine 212 of container orchestration system 102 maps the code of tagged tasks, templates and/or variables of operator 201 with the code of tagged tasks, templates and/or variables of CI/CD pipeline 202 forming "mappings." "Mappings," as used herein, refer to associating particular code of operator 201 with particular code of CI/CD pipeline 202.

In step 604, mapping engine 212 of container orchestration system 102 maps the code of tagged tasks, templates and/or variables between roles 203 of operator 201 forming "mappings."

As stated above, in one embodiment, mapping engine 212 utilizes two different types of mappings. One type is to map the code of tagged tasks, templates and/or variables between operator 201 and CI/CD pipeline 202. Another type of mapping involves mapping the code of tagged tasks, templates and/or variables between roles 203 of operator 201. In this manner, dependencies and interactions between operator 201 and CI/CD pipeline 202 or between roles 203 inside operator 201 can be discovered. By discovering such dependencies and interactions, the root cause of a failure in the CI/CD pipeline 202 may be discovered as discussed further below.

In one embodiment, such mappings involve mapping rules established by an expert. For example, in one embodiment, the pseudocode for an illustrative mapping rule for mapping the code of tagged tasks, templates and/or variables between operator 201 and CI/CD pipeline 202 with the same name for roles 203, 206, respectively, is the following:

```
If tag.ojbectName is same and tag.objectType is same {
    If A.tag.action=create/delete/update and B.tag.action=check/get{
        add their mapping
    } else if A.tag.action=check and B.tag.action=check and object is
    external dependency{
        add their mapping
    }
}
```

Hence, in one embodiment, if the name and type of the tagged object for roles 203, 206 are the same, and if the action of the tagged object for role 203 corresponds to a create, delete or update action and the tagged object for role 206 corresponds to a check or get action, then such codes in operator 201 and CI/CD pipeline 202 are mapped together. For example, if the tags of a task of software product C in operator 201 are update, product_links and task and the tags of a task of software product C in CI/CD pipeline 202 are check, productB_links and task, then the code (e.g., tasks/update.yml and tasks/healthy-check-curl.yml) involving such tags for operator 201 and CI/CD pipeline 202, respectively, are mapped to each other.

In another embodiment, if the name and type of the tagged object for roles 203, 206 are the same, and if the action of the tagged object for role 203 corresponds to a check action and the tagged object for role 206 corresponds to a check and the object has external dependency, then such codes (e.g., job-check.yml and pod-check.yml) in operator 201 and CI/CD pipeline 202, respectively, are mapped together.

In one embodiment, the pseudocode for an illustrative mapping rule for mapping the code of tasks, templates and/or variables between roles 203 in operator 201 is the following:

```
If tag.ojbectName is same and tag.objectType is same {
    add their mapping
}
```

Hence, in one embodiment, if the tagged objects for roles 203 of operator 201 have the same name and type, then the code for such roles 203 are mapped to each other. For example, if the tags of a task of software product A in operator 201 are update, init job, productB_configmap and task and the tags of a task of software product B in operator 201 are create, productB_configmap and task, then the tagged objects for roles 203 have the same name and type (e.g., productB_configmap). As a result, the code (e.g., post-checks.yml and post-main.yml) for such tagged objects between roles 203 are mapped to each other.

In one embodiment, such mappings are stored in repository 211 by mapping engine 212. Furthermore, in one embodiment, such stored mappings include the tags (e.g., owner, such as role A, type of tag, such as task) associated with the code. For example, a mapping stored in repository 211 may have role 203A and task A (associated with code "post-checks.yml") associated with role 206A and task B (associated with code "post-main.yml").

In one embodiment, pull requests 205 may result in actions or results in CI/CD pipeline 202. Such actions or results are mapped together by mapping engine 212. Such mappings may provide a reference for future mappings. For example, a pull request 205 may correspond to an action (e.g., update in CI/CD pipeline 202) received by mapping engine 212 as shown by line 213. Hence, there may be a mapping between a pull request 205 in operator 201 and an action (e.g., update) in CI/CD pipeline 202. Such mappings may be stored in repository 211 by mapping engine 212.

Additionally, in one embodiment, pull requests 205 may involve new features or fixes for software bugs (errors, flaws or faults in the design, development or operation of computer software that causes it to produce an incorrect or unexpected result or to behave in unintended ways). When such new features or fixes for software bugs are tested in CI/CD pipeline 202, and the test was successfully completed in CI/CD pipeline 202, then such new features 214 and bugs 215 may be stored in issue tracking and project management system 216. Furthermore, in one embodiment, a new test path may be added to CI/CD pipeline 202. Alternatively, when such a test results in a failure in CI/CD pipeline 202, an analysis, such as a static or dynamic analysis, is performed on CI/CD pipeline 202 in which the bug 215 is reported to issue tracking and project management system 216. Such features and fixes for software bugs as well as the test results in CI/CD pipeline 202 are mapped together, where such mappings are stored in repository 211.

Furthermore, in one embodiment, mappings may involve historical failures in CI/CD pipeline 102, which may be stored in repository 211 by mapping engine 212. For example, pull requests 205 for regression, a new role or for updating code (code changes) of a software product with a dependency component which resulted in a failure in CI/CD pipeline 202 may be mapped to failures in CI/CD pipeline 202. Such mappings may be stored in repository 211 by mapping engine 212 which may be used as a reference for future analysis involving the identification of the root cause of a failure in CI/CD pipeline 202.

After the tags and mappings are stored in repository 211, failures that occur in CI/CD pipeline 211 are identified using such tags and mappings in repository 211 as discussed below in connection with FIG. 7.

FIG. 7 is a flowchart of a method 700 for handling failures in a CI/CD pipeline (e.g., CI/CD pipeline 202) involving software products with dependencies between them in accordance with an embodiment of the present disclosure.

Referring to FIG. 7, in conjunction with FIGS. 1-6, in step 701, issue tracking and project management system 216 of container orchestration system 102 receives a notification of a test failure in Ct/CD pipeline 202.

As discussed above, such a notification may be in the form of a text file with results, an exit code from the test application, or text sent to STDOUT that can be redirected or captured. Upon receiving such a notification, issue tracking and project management system 216 informs error cause locator 217 regarding the test failure, which in turn, identifies the root cause of such a failure in CI/CD pipeline 202 as discussed below.

In step 702, error cause locator 217 of container orchestration system 102 identifies the root cause of the failure in CI/C) pipeline 202 by searching the mappings stored in repository 211 as discussed further below in connection with FIG. 8.

In step 703, error cause locator 217 of container orchestration system 102 generates a report, which includes the root cause of the failure in CI/CD pipeline 202. Furthermore, such a report may include actions for addressing the root cause of the failure. A more detailed description of generating such a report is discussed below in connection with FIG. 8.

FIG. 8 is a flowchart of a method 800 for identifying the root cause of errors in a CI/CD pipeline (e.g., CI/CD pipeline 202), including errors involving software products with dependencies between them, in accordance with an embodiment of the present disclosure.

Referring to FIG. 8, in conjunction with FIGS. 1-7, in step 801, error cause locator 217 of container orchestration system 102 receives a role 206 and a task associated with the failure from CI/CD pipeline 202. For example, the test failure may have occurred during a testcase to validate software product C by role C 206C involving the task of "check configmap." Such information may be provided to error cause locator 217 by issue tracking and project management system 216, which tracks failures occurring in CI/CD pipeline 202.

In step 802, error cause locator 217 of container orchestration system 102 searches the mappings stored in repository 211 to identify the role 203 and the task of operator 201 associated with the received role 206 and task from the failure of CI/CD pipeline 202. For example, a mapping stored in repository 211 may have role 203C involving the task of "check configmap" mapped to role 206C involving the task of "check configmap."

As stated above, in one embodiment, such searching may be performed by error cause locator 217 utilizing natural language processing, where error cause locator 217 searches the mappings stored in repository 211 that match within a threshold degree of similarity the received role 206 and task from the failure of CI/CD pipeline 202.

After identifying such a mapping, in step 803, error cause locator 217 of container orchestration system 102 searches for an error of the identified role 203 (e.g., role 203C) of operator 201 in a log file of operator 201.

As discussed above, a "log file," as used herein, refers to a file that records events that occurred in connection with operator 201. For example, the log file may include an error message involving role 203C. For instance, a line (e.g., line number 422) in the log file may state "role C/tasks/check configmap ("ERROR")." Such an error corresponds to the root cause of the failure in CI/CD pipeline 202. Hence, upon error cause locator 217 identifying the error of the role 203 (e.g., role 203C) of operator 201 in the log file of operator 201 associated with the role 206 (e.g., role 206C) from the failure of CI/CD pipeline 202, error cause locator 217 identifies the root cause of the failure in CI/CD pipeline 202.

In step 804, error cause locator 217 of container orchestration system 102 determines whether an error was identified in the log file of operator 201.

If error cause locator 217 identifies an error involving the identified role (role 203C) of operator 201 in the log file of operator 201, then, in step 805, error cause locator 217 of container orchestration system 102 generates a report, which includes the root cause of the failure in CI/CD pipeline 202, such as the line of the error in the log file of operator 201 discussed above. Furthermore, in one embodiment, error cause locator 217 includes one or more actions in the report for addressing the root cause of the failure in CI/CD pipeline 202. In one embodiment, such actions involve updates to the code of CI/CD pipeline 202.

As previously discussed, such a report may include actions for addressing the root cause of the failure in CI/CD pipeline 202. In one embodiment, actions for addressing various root causes of failures in CI/CD pipeline 202 may be pre-populated in a data structure (e.g., table), such as by an expert. For example, such a data structure may include a listing of root causes for various failures in CI/CD pipeline 202 as well as a listing of actions to address such root causes. In one embodiment, such root causes correspond to the errors identified in the log file of operator 201. In one embodiment, error cause locator 217 is configured to match the root cause (e.g., error identified in the log file of operator 201) in such a data structure using natural language processing. In one embodiment, such a data structure resides within the storage device (e.g., storage device 511, 515) of container orchestration system 102.

Furthermore, as discussed above, in one embodiment, executor 218 receives the report from error cause locator 217 and executes or performs the actions listed in the report.

For example, in one embodiment, one of the actions may be to update the code of CI/CD pipeline 202. Furthermore, in one embodiment, one of the actions may be to schedule a regression test of the full or a partial selection of already executed test cases by roles 206 that are re-executed to ensure existing functionalities function properly. In one embodiment, such a regression test is performed after the actions in the report have been performed by executor 218, such as updates to the code of CI/CD pipeline 202. In one embodiment, executor 218 uses various software tools for implementing such actions, including, but not limited to, Collaborator®, Gerritt, Codestriker, Rhodecode, etc.

In one embodiment, executor 218 is configured to send such reports generated by error cause locator 217 to a developer, such as a user of software development system 102.

In one embodiment, the failures and actions listed in the reports generated by error cause locator 217 are stored in repository 211.

Referring to step 804, if, however, error cause locator 217 does not identify an error in the log file of operator 201 in connection with the identified role 203 of operator 201, then, in step 806, error cause locator 217 of container orchestration system 102 searches the mappings to identify an internal task of operator 201 that maps to the task (e.g., "check configmap") associated with the failure from CI/CD pipeline 202. An "internal task," as used herein, refers to a task of a role 203 (e.g., role A) involving a software product upon which the failed software product is dependent therefrom.

For example, a mapping stored in repository 211 may have role 203A involving the task of "check configmap" associated with the task from the failure of CI/CD pipeline 202 (e.g., role 206C involving the task of "check configmap"). In one embodiment, such searching may be performed by error cause locator 217 utilizing natural language processing, where error cause locator 217 searches the mappings stored in repository 211 for a mapping that includes a task that matches within a threshold degree of similarity the received task from the failure of CI/CD pipeline 202. Upon identifying such a mapping, such identified mapping may include an internal task of operator 201 that maps to the received task (e.g., "check configmap") from the failure of CI/CD pipeline 202.

In step 807, error cause locator 217 of container orchestration system 102 determines whether an internal task of operator 201 that maps to the task (e.g., "check configmap") associated with the failure from CI/CD pipeline 202 was identified.

If such a mapping was not identified, then, in step 808, error cause locator 217 of container orchestration system 102 generates a report indicating that the root cause of the failure in CI/CD pipeline 202 could not be determined.

In one embodiment, executor 218 issues the generated report to a developer, such as a user of software development system 102, such as via electronic means (e.g., electronic mail).

If, however, such a mapping is identified, then, in step 809, error cause locator 217 of container orchestration system 102 searches for an error of the identified internal task (e.g., "check configmap") of operator 201 in the log file of operator 201.

In step 810, error cause locator 217 of container orchestration system 102 determines whether an error was identified in the log file of operator 201.

As stated above, for example, the log file may include an error message involving the task "check configmap." For instance, a line (e.g., line number 722) in the log file may state "role A/tasks/check configmap ("ERROR")." In such an example, the root cause of the failure in CI/CD pipeline 202 was due to a dependency with another software product. For example, the error in CI/CD pipeline 202 involved role 206C, with the role of validating software product C. However, there was no error identified in the log file of operator 201 associated with role 203C, which is mapped to role 206C, since the root cause of the error does not involve software product C. Instead, the root cause of such a failure may be due to a change in software product A, in which software product C depends upon software product B which depends upon software product A. The root cause of a failure in CI/CD pipeline 201 involving a dependency with another software product may be discovered by error cause locator 217 by locating a mapping of the task ("check configmap") involved in the failure of CI/CD pipeline 201 with an internal task of operator 201, in which an error in the log file of operator 201 involving such a task is identified. For example, a line (e.g., line number 722) in the log file may state "role A/tasks/check configmap ("ERROR")" indicating that the error was a result of an error with respect to software product A (role A is tasked for deploying software product A). Such an error would not have previously been captured since the error involved a dependency upon another software product.

Furthermore, such an error corresponds to the root cause of the failure in CI/CD pipeline 202. Hence, upon error cause locator 217 identifying the error of the task (e.g., "check configmap") of operator 201 in the log file of operator 201 associated with the task (e.g., "check configmap") from the failure of CI/CD pipeline 202, error cause locator 217 identifies the root cause of the failure in CI/CD pipeline 202.

If error cause locator 217 identifies an error involving the identified task (e.g., "check configmap") of operator 201 in the log file of operator 201, then, in step 811, error cause locator 217 of container orchestration system 102 generates a report, which includes the root cause of the failure in CI/CD pipeline 202, such as the line of the error in the log file of operator 201 discussed above. Furthermore, in one embodiment, error cause locator 217 includes one or more actions in the report for addressing the root cause of the failure in CI/CD pipeline 202. In one embodiment, such actions involve updates to the code of CI/CD pipeline 202.

As previously discussed, such a report may include actions for addressing the root cause of the failure in CI/CD pipeline 202. In one embodiment, actions for addressing various root causes of failures in CI/CD pipeline 202 may be pre-populated in a data structure (e.g., table), such as by an expert. For example, such a data structure may include a listing of root causes for various failures in CI/CD pipeline 202 as well as a listing of actions to address such root causes. In one embodiment, such root causes correspond to the errors identified in the log file of operator 201. In one embodiment, error cause locator 217 is configured to match the root cause (e.g., error identified in the log file of operator 201) in such a data structure using natural language processing. In one embodiment, such a data structure resides within the storage device (e.g., storage device 511, 515) of container orchestration system 102.

Furthermore, as discussed above, in one embodiment, executor 218 receives the report from error cause locator 217 and executes or performs the actions listed in the report.

For example, in one embodiment, one of the actions may be to update the code of CI/CD pipeline 202. Furthermore, in one embodiment, one of the actions may be to schedule a regression test of the full or a partial selection of already executed test cases by roles 206 that are re-executed to ensure existing functionalities function properly. In one embodiment, such a regression test is performed after the actions in the report have been performed by executor 218, such as updates to the code of CI/CD pipeline 202. In one embodiment, executor 218 uses various software tools for implementing such actions, including, but not limited to, Collaborator®, Gerritt, Codestriker, Rhodecode, etc.

In one embodiment, executor 218 is configured to send such reports generated by error cause locator 217 to a developer, such as a user of software development system 102.

If, however, error cause locator 217 does not identify an error involving the task (e.g., "check configmap") of operator 201 in the log file of operator 201, then, in step 808, error cause locator 217 of container orchestration system 102 generates a report indicating that the root cause of the failure in CI/CD pipeline 202 could not be determined.

In one embodiment, executor 218 issues the generated report to a developer, such as a user of software development system 102, such as via electronic means (e.g., electronic mail).

As a result of the foregoing, embodiments of the present disclosure provide a means for effectively identifying the failure in a CI/CD pipeline involving an operator installing multiple software products that have dependencies between them in a container orchestration system by mapping tagged tasks, templates and/or variables between the operator and the CI/CD pipeline as well as mapping the tagged tasks, templates and/or variables between the roles in the operator thereby enabling dependences and interactions between the operator and the CI/CD pipeline or between the roles inside the operator to be discovered. By discovering such dependencies and interactions, the root cause of a failure in the CI/CD pipeline may be discovered.

Furthermore, the principles of the present disclosure improve the technology or technical field involving continuous integration and continuous delivery (CI/CD). As discussed above, container orchestration systems are designed for automation, such as automating a task beyond what container orchestration systems typically provide. Such automation may be performed via the use of "operators." Operators are clients of the container orchestration system's application programming interface (API) that act as controllers for a custom resource. Examples of operations performed by operators include: deploying an application on demand, taking and restoring backups of that application's state, handling upgrades of the application code alongside related changes, such as database schemas or extra configuration settings, publishing a service to applications that do not support APIs to discover them, simulating failure in all or part of a cluster to test its resilience, etc. Another example of an operation performed by operators is the installation of a series of software products that are interrelated and integrated in the container orchestration system. The operator's CI/CD then checks the quality of these installed multiple software products that have dependencies between them. As discussed above, a CI/CD pipeline automates the software delivery process. To avoid delivery delays, failures in the CI/CD pipeline need to be resolved quickly. For a simple project, such failures in the CI/CD pipeline may be resolved by implementing a revert commend, which corresponds to a forward-moving undo operation. However, such a method is not applicable in all cases, such as when failures occur in the CI/CD pipeline involving a series of software products that are interrelated and integrated. For example, when an operator installs a series of software products that are interrelated and integrated in the container orchestration system, the operator's CI/CD then checks the quality of these installed software products that have dependencies between them. However, testing the quality of multiple software products that have dependencies between them is complicated and identifying the root cause of a failure involving such software products may not be easy to capture. For instance, if an operator installed software products A, B and C that have dependencies between them and a failure occurred in the operator's CI/CD process involving a function test of software product C, the root cause may not be able to be identified, such as by implementing a revert command. For example, if software product C depends upon software product B which depends upon software product A, and the root cause of the failure was due to a change in software product A, then a revert comment, which corresponds to a forward-moving undo operation, would not capture the change in software product A. As a result, such a failure in the CI/CD process would not be captured. Hence, there is not currently a means for effectively identifying the failure in a CI/CD pipeline involving an operator installing multiple software products that have dependencies between them in a container orchestration system.

Embodiments of the present disclosure improve such technology by extracting tags for tasks, templates and/or variables of the operator as well as tags for tasks, templates and/or variables of the CI/CD pipeline. In one embodiment, such tags are extracted by analyzing the code of the operator and the CI/CD pipeline, such as via static analysis or dynamic analysis. Code of the tagged tasks, templates and/or variables of the operator are mapped with the code of the tagged tasks, templates and/or variables of the CI/CD pipeline forming mappings. Additionally, code of the tagged tasks, templates and/or variables between the roles of the operator are mapped forming mappings. By forming such mappings, dependencies and interactions between the operator and the CI/CD pipeline or between roles inside the operator may be discovered. By discovering such dependencies and interactions, the root cause of a failure in the CI/CD pipeline may be discovered. For example, upon receiving a notification of a failure in the CI/CD pipeline, a root cause of the failure may be identified by searching such mappings for a mapped role or task in relation to the role or task involving the software product which failed in the CI/CD pipeline and searching the log file of the operator for an error in connection with such mapped role or task. In this manner, failures in the CI/CD pipeline involving an operator installing multiple software products that have dependencies between them in the container orchestration system may be discovered. Furthermore, in this manner, there is an improvement in the technical field involving continuous integration and continuous delivery (CI/CD).

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying a root cause of failures in a continuous integration and continuous delivery (CI/CD) pipeline, the method comprising:

extracting tags for tasks, templates and/or variables of an operator;
extracting tags for tasks, templates and/or variables of said CI/CD pipeline;
mapping code of tagged tasks, templates and/or variables of said operator with code of tagged tasks, templates and/or variables of said CI/CD pipeline to form mappings associating particular code of said operator with particular code of said CI/CD pipeline thereby discovering dependencies and interactions between said operator and said CI/CD pipeline;
mapping code of tagged tasks, templates and/or variables between roles of said operator to form said mappings thereby discovering dependencies and interactions between said roles inside said operator;
receiving a notification of a failure in said CI/CD pipeline involving said operator installing multiple software products that have dependencies between them in a container orchestration system; and
identifying a root cause of said failure by searching said mappings.

2. The method as recited in claim 1 further comprising:
receiving a role and a task associated with said failure from said CI/CD pipeline; and
searching said mappings to identify a role and a task of said operator associated with said role and said task associated with said failure of said CI/CD pipeline.

3. The method as recited in claim 2 further comprising:
searching for an error of said identified role of said operator in a log file of said operator;
identifying a line in said log file of said operator detailing said error in response to identifying said error of said identified role of said operator in said log file of said operator; and
generating a report comprising said identified line of said error as said root cause of said failure in said CI/CD pipeline.

4. The method as recited in claim 2 further comprising:
searching said mappings to identify an internal task of said operator mapped to said task associated with said failure of said CI/CD pipeline in response to not identifying an error of said identified role of said operator in a log file of said operator.

5. The method as recited in claim 4 further comprising:
searching for an error of said identified internal task of said operator in said log file of said operator;
identifying a line in said log file of said operator detailing said error in response to identifying said error of said identified internal task of said operator in said log file of said operator; and
generating a report comprising said identified line of said error as said root cause of said failure in said CI/CD pipeline.

6. The method as recited in claim 1 further comprising:
generating a report comprising one or more actions for addressing said identified root cause of said failure in said CI/CD pipeline.

7. The method as recited in claim 1, wherein said tags for tasks, templates and/or variables of said operator and said CI/CD pipeline are extracted by analyzing code of said operator and said CI/CD pipeline.

8. A computer program product for identifying a root cause of failures in a continuous integration and continuous delivery (CI/CD) pipeline, the computer program product comprising one or more computer readable storage mediums having program code embodied therewith, the program code comprising programming instructions for:
extracting tags for tasks, templates and/or variables of an operator;
extracting tags for tasks, templates and/or variables of said CI/CD pipeline;
mapping code of tagged tasks, templates and/or variables of said operator with code of tagged tasks, templates and/or variables of said CI/CD pipeline to form mappings associating particular code of said operator with particular code of said CI/CD pipeline thereby discovering dependencies and interactions between said operator and said CI/CD pipeline;
mapping code of tagged tasks, templates and/or variables between roles of said operator to form said mappings thereby discovering dependencies and interactions between said roles inside said operator;
receiving a notification of a failure in said CI/CD pipeline involving said operator installing multiple software products that have dependencies between them in a container orchestration system; and
identifying a root cause of said failure by searching said mappings.

9. The computer program product as recited in claim 8, wherein the program code further comprises the programming instructions for:
receiving a role and a task associated with said failure from said CI/CD pipeline; and
searching said mappings to identify a role and a task of said operator associated with said role and said task associated with said failure of said CI/CD pipeline.

10. The computer program product as recited in claim 9, wherein the program code further comprises the programming instructions for:
searching for an error of said identified role of said operator in a log file of said operator;
identifying a line in said log file of said operator detailing said error in response to identifying said error of said identified role of said operator in said log file of said operator; and
generating a report comprising said identified line of said error as said root cause of said failure in said CI/CD pipeline.

11. The computer program product as recited in claim 9, wherein the program code further comprises the programming instructions for:
searching said mappings to identify an internal task of said operator mapped to said task associated with said failure of said CI/CD pipeline in response to not identifying an error of said identified role of said operator in a log file of said operator.

12. The computer program product as recited in claim 11, wherein the program code further comprises the programming instructions for:
searching for an error of said identified internal task of said operator in said log file of said operator;
identifying a line in said log file of said operator detailing said error in response to identifying said error of said identified internal task of said operator in said log file of said operator; and
generating a report comprising said identified line of said error as said root cause of said failure in said CI/CD pipeline.

13. The computer program product as recited in claim 8, wherein the program code further comprises the programming instructions for:
generating a report comprising one or more actions for addressing said identified root cause of said failure in said CI/CD pipeline.

14. The computer program product as recited in claim 8, wherein said tags for tasks, templates and/or variables of said operator and said CI/CD pipeline are extracted by analyzing code of said operator and said CI/CD pipeline.

15. A system, comprising:
  a memory for storing a computer program for identifying a root cause of failures in a continuous integration and continuous delivery (CI/CD) pipeline; and
  a processor connected to said memory, wherein said processor is configured to execute program instructions of the computer program comprising:
    extracting tags for tasks, templates and/or variables of an operator;
    extracting tags for tasks, templates and/or variables of said CI/CD pipeline;
    mapping code of tagged tasks, templates and/or variables of said operator with code of tagged tasks, templates and/or variables of said CI/CD pipeline to form mappings associating particular code of said operator with particular code of said CI/CD pipeline thereby discovering dependencies and interactions between said operator and said CI/CD pipeline;
    mapping code of tagged tasks, templates and/or variables between roles of said operator to form said mappings thereby discovering dependencies and interactions between said roles inside said operator;
    receiving a notification of a failure in said CI/CD pipeline involving said operator installing multiple software products that have dependencies between them in a container orchestration system; and
    identifying a root cause of said failure by searching said mappings.

16. The system as recited in claim 15, wherein the program instructions of the computer program further comprise:
  receiving a role and a task associated with said failure from said CI/CD pipeline; and
  searching said mappings to identify a role and a task of said operator associated with said role and said task associated with said failure of said CI/CD pipeline.

17. The system as recited in claim 16, wherein the program instructions of the computer program further comprise:
  searching for an error of said identified role of said operator in a log file of said operator;
  identifying a line in said log file of said operator detailing said error in response to identifying said error of said identified role of said operator in said log file of said operator; and
  generating a report comprising said identified line of said error as said root cause of said failure in said CI/CD pipeline.

18. The system as recited in claim 16, wherein the program instructions of the computer program further comprise:
  searching said mappings to identify an internal task of said operator mapped to said task associated with said failure of said CI/CD pipeline in response to not identifying an error of said identified role of said operator in a log file of said operator.

19. The system as recited in claim 18, wherein the program instructions of the computer program further comprise:
  searching for an error of said identified internal task of said operator in said log file of said operator;
  identifying a line in said log file of said operator detailing said error in response to identifying said error of said identified internal task of said operator in said log file of said operator; and
  generating a report comprising said identified line of said error as said root cause of said failure in said CI/CD pipeline.

20. The system as recited in claim 15, wherein the program instructions of the computer program further comprise:
  generating a report comprising one or more actions for addressing said identified root cause of said failure in said CI/CD pipeline.

* * * * *